Sept. 25, 1962 N. L. COTTON 3,055,091

STRIPPING DEVICE

Filed Oct. 31, 1958 4 Sheets-Sheet 1

INVENTOR.
Norman L. Cotton
BY Flehr & Swain
Attorneys

Sept. 25, 1962 N. L. COTTON 3,055,091

STRIPPING DEVICE

Filed Oct. 31, 1958 4 Sheets-Sheet 2

INVENTOR.
Norman L. Cotton

BY Fisher & Swain

Attorneys

Sept. 25, 1962 N. L. COTTON 3,055,091

STRIPPING DEVICE

Filed Oct. 31, 1958 4 Sheets-Sheet 3

INVENTOR.
Norman L. Cotton
BY [signature]
Attorneys

Sept. 25, 1962 N. L. COTTON 3,055,091

STRIPPING DEVICE

Filed Oct. 31, 1958

4 Sheets-Sheet 4

INVENTOR.
Norman L. Cotton

BY [signature]

Attorneys

United States Patent Office 3,055,091

Patented Sept. 25, 1962

3,055,091

STRIPPING DEVICE

Norman L. Cotton, 265 Marmona Court, Menlo Park, Calif.

Filed Oct. 31, 1958, Ser. No. 771,100
8 Claims. (Cl. 29—200)

This invention relates to a stripping device and more particularly to a stripping device utilized for removing plates and cards from Addressograph frames.

The manual removal of cards and plates from Addressograph frames has always been a difficult and laborious task. When the cards and plates are removed by hand, the fingers often become sore and finger nails are often broken. It is also a very dirty task because of the accumulation of ink and grime on the plates. In addition to the above disadvantages, manual removal is also expensive because of the large amount of time required for removing the cards and plates. Devices heretofore provided to facilitate removal have been quite unsatisfactory.

In general, it is an object of the present invention to provide a stripping device which can be utilized for rapidly removing cards and plates from frames.

Another object of the invention is to provide a stripping device of the above character in which it is unnecessary to touch the cards and plates.

Another object of the invention is to provide a stripping device of the above character in which the cards and plates are removed by shifting the frames.

Another object of the invention is to provide a stripping device of the above character by which any one card or plate or any combination of cards and plates can be removed from a frame.

Another object of the invention is to provide a stripping device of the above character in which the cards and plates are removed simultaneously.

Another object of the invention is to provide a stripping device of the above character which is adapted for different types of frames.

Another object of the invention is to provide a stripping device of the above character in which a hopper is provided for storing the frames to be stripped.

Another object of the invention is to provide a stripping device of the above character in which an additional hopper is provided for the stripped frames.

Another object of the invention is to provide a stripping device of the above character in which the plates and cards stripped from the frames are automatically discharged from the device.

Another object of the invention is to provide a stripping device of the above character which is easy to operate.

Additional objects and features of the invention will appear from the following description in which the preferred embodiments have been set forth in detail in conjunction with the accompanying drawings.

Referring to the drawing.

In general, the present invention consists of a framework which is provided with a flat upper surface. Guide means is located on the flat surface and serves to guide the frames from which the cards and plates are to be removed. Means are mounted on the framework so that when the frames are moved in one direction, one end of the plate and one end of the card in the frame are released. Means is also mounted on the framework so that when the frame is moved in an opposite direction, the card and the plate are forced out of or ejected from the frame.

Figure 1:
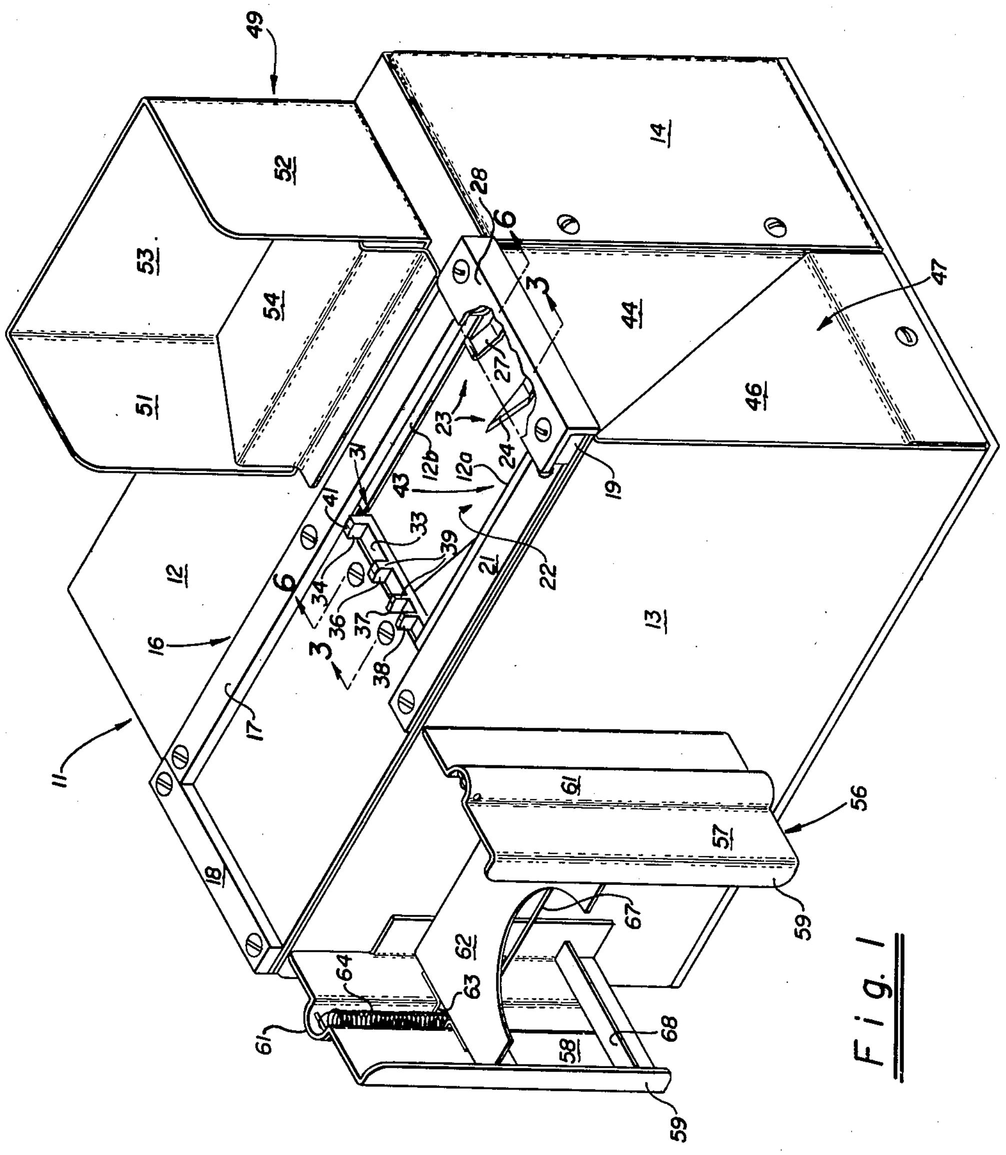
FIGURE 1 is an isometric view of a stripping device incorporating the present invention.

The embodiment of the stripping device shown in FIGURE 1 of the drawing consists of a rectangular framework 11 formed of suitable material such as sheet metal. The framework includes a top wall 12 which provides a flat upper surface, a vertical front wall 13 and a vertical side wall 14.

Guide means 16 is mounted on the top wall 12 for guiding frames as hereinafter described. The guide means consists of a bar 17 which is fastened to the top wall and extends longitudinally of the top wall substantially equidistant from the front and rear side edges of the framework. The guide means also includes bars 18 and 19 which abut the bar 16 and extend transversely of the rectangular frame work and lie adjacent the end walls of the framework. A bar 21 abuts the bar 19 and is mounted on the framework 11 adjacent the front wall 13.

A rectangular opening 22 is provided in the near front side of the top wall 12 for a purpose hereinafter described. It will be noted that the opening is of such a size that portions 12*a* and 12*b* of the top wall extend out from the parallel bars 17 and 21.

Means 23 for releasing the members releasably carried by the frames is provided on the right-hand side of the opening 22 and consists of a triangularly-shaped sharp pointed finger 24 which is mounted beneath the bar 19 by suitable means such as screws 26. As will be noted from FIGURE 3 of the drawing, the outer end of the finger is inclined upwardly from the point where it is mounted on the bar 19. The releasing means 23 also includes the spring button-like releasing member 27 as shown particularly in FIGURE 6 which is mounted beneath the bar 19 and spaced from the finger 24. The outer end of the button is provided with an inwardly turned portion 27*a* which extends upwardly from the point where the button member 27 is attached. A protective cover plate 28 is mounted on the member 19 and overlies the finger 24 and the button member 27 to prevent accidental engagement with the sharp point of the finger 24.

Means 31 is provided for removing the flat rectangular members from the frame and consists of upstanding abutments formed on a member 33. The member 33 is affixed to the top wall 12 adjacent the opening 22 and is parallel to the bar 19. Abutments 34 and 36 are provided on one end of the member 33 for the purpose of rejecting the plates from the frames as herinafter described, and abutments 37 and 38 are provided for rejecting the cards from the frames, as also hereinafter described. Each of the abutments is provided with a vertical forward face 39 and an inclined rear face 41.

A chute 43 is formed underneath the opening 22 by the front wall 13, a wall 44 parallel to the front wall 13 and an inclined bottom wall 46 which slopes downwardly. The chute empties through a discharge opening 47 for a purpose hereinafter described.

An unstripped-frame hopper 49 is mounted on the top wall 12 adjacent the opening 22 and is provided with side walls 51 and 52 and a rear wall 53. A bottom supporting wall 54 which inclines downwardly to the rear is provided between the side and rear walls.

A stripped-frame hopper 56 is mounted on the front wall 13 at a point removed from the opening 22. The hopper 56 consists of side walls 57 and 58 which are provided with inwardly turned portions 59 and grooves 61. A movable bottom plate or wall 62 is mounted between the side walls 57 and 58 and is provided with U shaped members 63 which ride in the grooves 61. Springs 64 mounted in the grooves 61 serve to support the wall 62. The top end of each of the springs is fastened to a pin 66 and the bottom end is fastened to a rod 67. Stops 68 are mounted on the side walls and serve to limit the lowermost position of the movable bottom wall 62.

Figure 2:
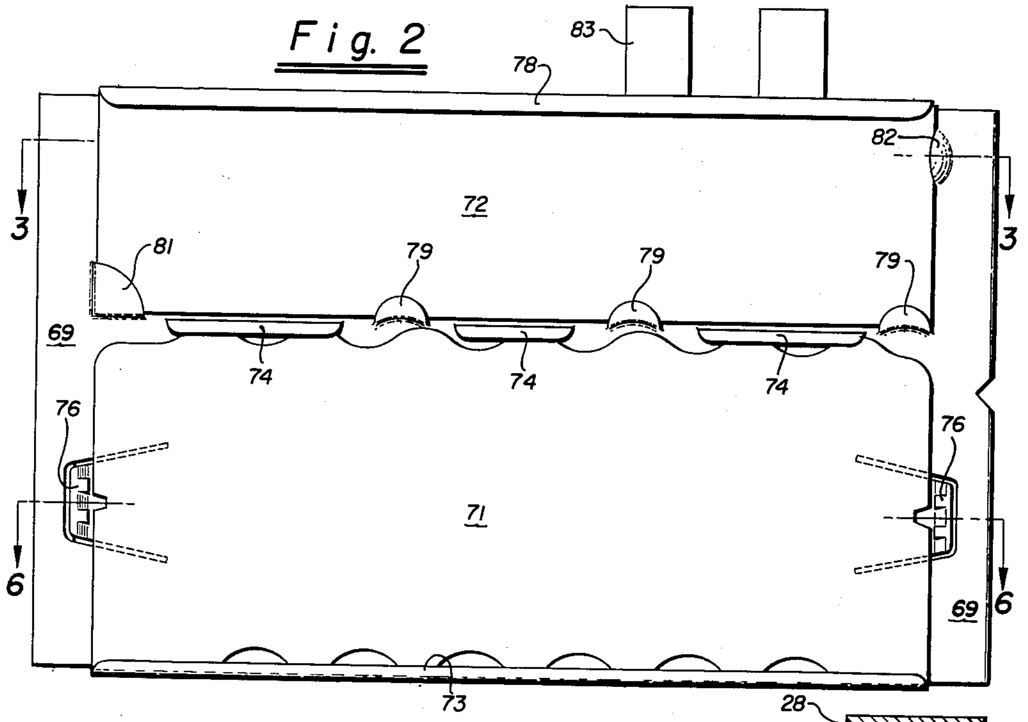
FIGURE 2 is an enlarged view of one side of an Addressograph frame with a metal plate and a paper card.

Operation of this embodiment of my invention may now be briefly described as follows. In discussing the operation of my stripping device, let it be assumed that a plurality of Addressograph frames of the type shown in FIGURE 2 are to be stripped of their cards and plates. Such an Addressograph plate as shown consists of a rectangular frame 69 of a type that is conventionally called a Loktab frame. Such frames are well known to those skilled in the art. The particular type of Loktab frame shown in FIGURE 2 contains provisions for releasably holding a rectangular member or plate 71 which is normally termed the Addressograph plate and releasably holding a rectangular index member or card 72. As shown, the plate 71 is held in place by an upturned bottom flange 73 and downturned top flanges 74. A pair of spring members 76 cut into the frame 69 and normally engage the sides of the plate and serve to hold the plate in place. As is well known to those skilled in the art, the spring members 76 are adapted to be depressed to permit removal of the plate 71.

The index card 72 is held in place by a downturned top flange 78, upturned bottom flanges 79, a corner flange 81, and a raised portion 82 on the side opposite the side on which the corner 81 is mounted. The Loktab frame is also provided with tabs 83 which are secured to the frame in a manner well known to those skilled in the art.

When it is desired to strip the plates and cards from a plurality of the Loktab frames, the Loktab frames are placed in the hopper 49 with the plates 71 and cards 72 down, and with the tabs to the front facing the opening 22. One of the frames is then lifted from the pile of frames in the hopper 49 and placed down over the opening 22 so that the rear edge abuts the bar 17. The front edge of the frame is then let down, and then while pressing downwardly on the back of the frame, a force is applied to the frame to slide it toward the right as viewed in FIGURE 1 until the right-hand edge of the frame is moved underneath the protective cover plate 28. The inclined portions 41 on the abutments facilitate this movement to the right. As the frame is being moved to the right, the finger 24 engages the lower side of the frame and moves between the card and the frame as shown in FIGURES 3 and 4 to lift that edge of the card above the raised portion 82 of the frame.

Figures 3, 4, 5, 6, 7, 8:
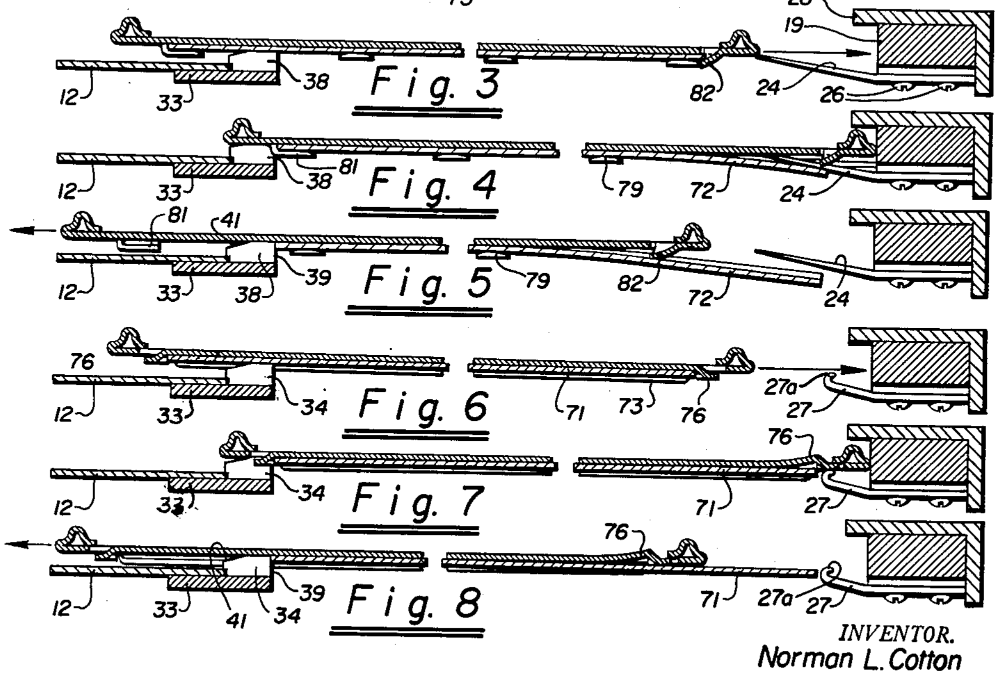
FIGURE 3 is an enlarged partial cross-sectional view taken along the line 3—3 of FIGURE 1.
FIGURE 4 is a cross-sectional view similar to FIGURE 3 but showing the frame in an extreme right position in which the card is being released.
FIGURE 5 is a cross-sectional view similar to FIGURES 2 and 3 but showing the frame being moved to the left as viewed in FIGURE 5 and showing the card being removed from the frame.
FIGURE 6 is an enlarged partial cross-sectional view taken along the line 6—6 of FIGURE 1.
FIGURE 7 is a cross-sectional view similar to FIGURE 6 showing the frame in the extreme right position and showing the plate being released.
FIGURE 8 is a cross-sectional view similar to FIGURES 6 and 7 showing the frame being moved towards the left and showing the plate being removed or ejected from the frame.

At approximately the same time, the button-like member 27 engages the right-hand spring finger 76 to urge it upwardly as shown in FIGURE 7 to unlock the plate 71.

Pressure is still maintained on the back of the frame and then force is applied to slide the frame to the left as viewed in FIGURE 1 as guided by the bar 17.

As the frame is moved to the left, the abutments 37 and 38 engage the card 72 and cause ejection of the card from between the flanges 78 and 79 into the discharge chute 43. At approximately the same time, the abutments 34 and 36 engage the plate 71 and cause ejection of the plate into the chute as shown in FIGURE 8.

By setting the stripping device adjacent the right-hand edge of a desk, the ejected plates and cards can be discharged directly into a suitable receptacle such as a waste paper basket.

The frame from which the plate and card has been discharged is then moved to the extreme left into engagement with the bar 18 after which it is then moved forwardly and dropped into the hopper 56 between the side walls 57 and 58 onto the bottom wall 62. After this has been accomplished, the next Loktab frame can be taken from the hopper 49 and the same operation performed and the stripped frame dropped into the hopper 56..

Figures 9, 10:
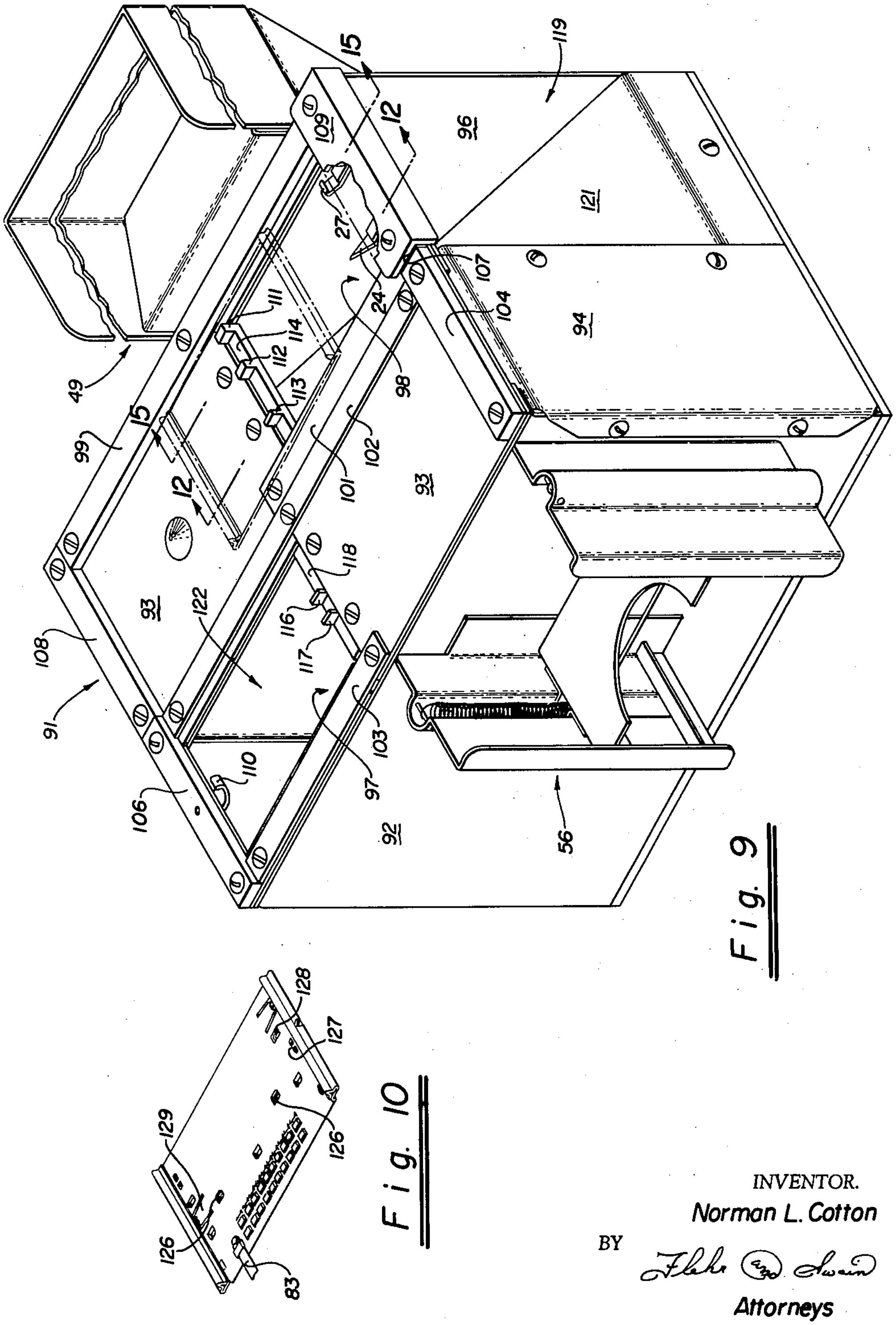
FIGURE 9 is an isometric view showing another embodiment of my stripping device incorporating the present invention.
FIGURE 10 is an isometric view of an Addressograph frame of the type adapted to be stripped by the stripping device shown in FIGURE 9.

Another embodiment of my invention as shown in FIGURE 9 which is particularly adapted for stripping frames having more than one Addressograph plate in the frame. This embodiment consists of a framework 91 which includes a front wall 92, a top wall 93, a side wall 94 and a rear wall 96. The top wall is provided with front and rear openings 97 and 98. Guide means consisting of parallel bars 99 and 101 are mounted on the top wall adjacent the opening 98 and parallel bars 102 and 103 are mounted adjacent the opening 97. Parallel bars 104 and 106 are mounted on the front side of the top surface, and parallel bars 107 and 108 are mounted on the back portion of the top wall. A protective covering plate 109 is mounted on the bar 107.

Mounted beneath the bar 107 is a finger 24 and a button-like releasing member 27. Mounted beneath the bar 106 is another button-like releasing member 110. Abutments 111, 112 and 113 are formed on a member 114 mounted on the top wall 93 on one side of the opening 98. Abutments 116 and 117 are formed on a member 118 mounted on the top wall 93 on one side of the opening 97.

An unstripped frame hopper 49 is mounted on the rear wall 96 of the framework 91 adjacent the opening 98. A stripped frame hopper 56 is mounted on the front wall 92 at a point removed from the opening 97.

A chute 119 including a downwardly inclined bottom wall 121 is provided below the opening 98 similar to chute 43. A similar chute 122 is also provided beneath the opening 97.

Figure 11:
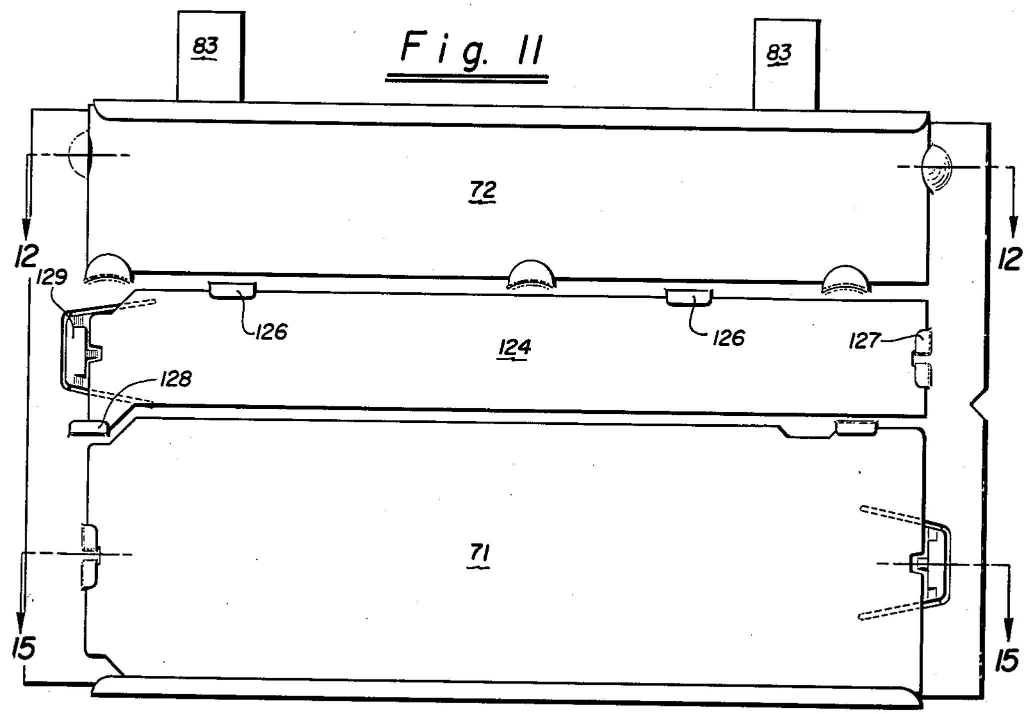
FIGURE 11 is an enlarged detail view of an Addressograph frame which utilizes one card and two plates.
Figures 12, 13, 14, 15, 16, 17:
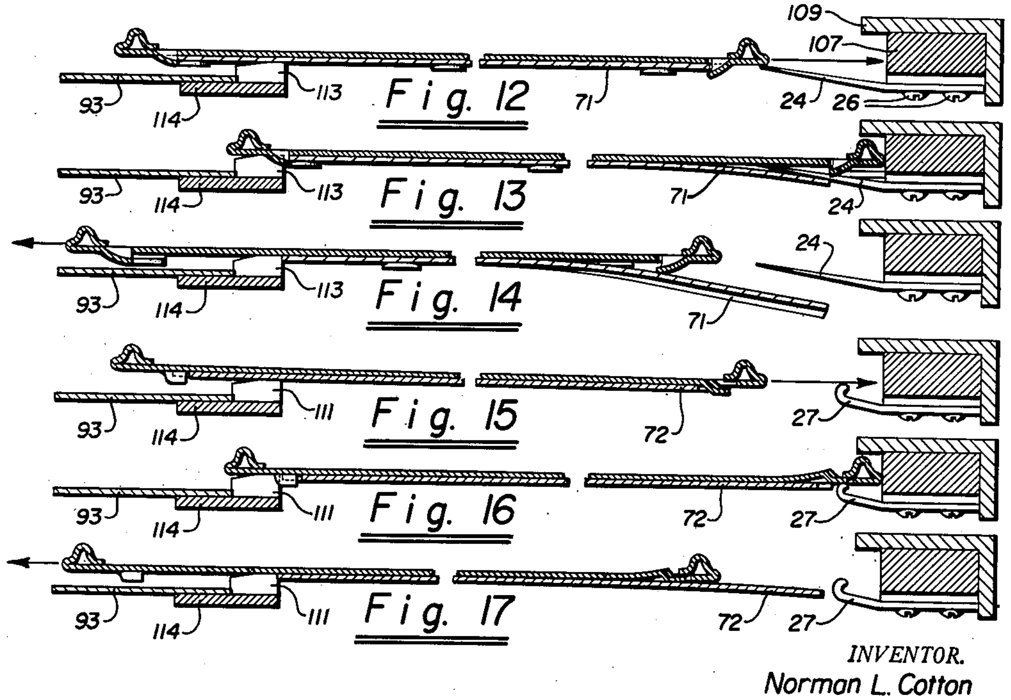
FIGURE 12 is an enlarged partial cross-sectional view taken along the line 12—12 of FIGURE 9 showing a frame being moved to the right.
FIGURE 13 is a cross-sectional view similar to FIGURE 12 but showing the frame in the extreme right position and the card being released from the frame.
FIGURE 14 is a cross-sectional view similar to FIGURES 12 and 13 showing the frame being moved to the left and showing removal of the card therefrom.
FIGURE 15 is an enlarged cross-sectional view taken along the line 15—15 of FIGURE 9 showing the frame being moved to the right.
FIGURE 16 is a cross-sectional view similar to FIGURE 15 showing the frame in the extreme right position and showing the plate being released from the frame.
FIGURE 17 is a cross-sectional view similar to FIGURES 15 and 16 showing the frame being moved to the left and the plate being removed therefrom.

As hereinbefore stated, this embodiment of my invention is particularly adapted for stripping frames which contain at least two Addressograph plates and one index card. As shown in the frame in FIGURE 11, such a frame can contain an additional plate 124 which is held in place by downturned flanges 126, an inturned side flange 127 and a bottom upturned flange 128, together with a spring finger 129.

In utilizing the stripping device, the unstripped frames are unloaded in the hopper 49 with the plates down and with the tabs 83 facing forwardly. The top frame is then removed and placed face down over the rear opening 98 with the rear edge adjacent the guide bar 99. The front edge is then lowered and pressure is applied on the back side of the frame. The frame is then pressed downwardly and moved to the right under the protective covering plate 109 so that the spring finger 24 and the button-like releasing member 27 under the member 107 serve to release or unlock the card 72 and the plate 71. While still maintaining pressure on the back side of the frame, the frame is moved to the left so that the abutments 111, 112 and 113 cause ejection of the card 72 and the plate 71 in a manner similar to that hereinbefore described. The frame is moved completely to the left until it engages the bar 108 after which it is lifted slightly and placed over the opening 97. Then, while pressing downwardly on the frame, the frame is slid to the left so that the member 110 engages the spring finger 129 to release the plate 124. While still maintaining the pressure on the back of the frame, the frame is moved to the right so that the abutments 116 and 117 eject the plate 124 and cause the discharge thereof through the chute 122. The frame is then moved to the right until it engages the bar 104 after which it is dropped into the stripped frame hopper 56. After this operation has been completed, another unstripped frame can be removed from the hopper 49 and placed through the same sequence of operations to strip the cards and plates therefrom after which the frame is placed in the hopper 56.

It is apparent from the foregoing that merely by shifting the positions of the fingers 24 and the button-like releasing members 27, cards and plates in any position on the frames may be released and by shifting the positioning of the released cards and plates may be ejected from the frame upon movement of the frame in the manner hereinbefore described. Also, in accordance with the present invention, it is apparent that any combination of cards and plates can be removed from frames of the type hereinbefore described.

It is also apparent from the foregoing that the cards and plates can be removed from the frames rapidly and with ease in a very clean operation.

I claim:

1. In a stripping device for removing flat members releasably retained in frames, a framework having a wall, means mounted on the wall serving to guide the movement of the frame, means mounted on said framework and constructed and arranged to free one end of at least one of said members as the frame is urged in one direction, and means mounted on the framework and constructed to eject the released member from the frame as the frame is moved in an opposite direction.

2. In a stripping device for removing flat members retained in a frame, a framework having a flat top wall, guide means mounted on the top wall serving to guide the movement of the frames as they are moved thereon, said top wall being formed with an opening therein, means mounted on the framework on one side of said opening to free one end of at least one member retained in said frame as the frame is moved into engagement with said means, and means mounted on said framework on the other side of said opening for ejecting the released member from the frame as the frame is moved in an opposite direction over said last named means and disposed with respect to said opening to permit the member to drop downwardly by force of gravity from the frame, and a chute mounted below said opening serving to receive the members ejected from the frames.

3. In a stripping device for removing cards and plates releasably retained in frames, a framework having a top wall, guide means mounted on the top wall for guiding the movement of the frames as they are moved thereon, said top wall being formed with an opening therein, means mounted on the framework on one side of said opening for releasing one end of each of the cards and plates mounted in said frame as the frame is urged into engagement with said means, means mounted on said framework on the other side of said opening for ejecting the released cards and plates as the frame is moved in an opposite direction over said last named means.

4. A stripping device as in claim 3 wherein said top wall is formed with an additional opening, and means mounted on said framework on one side of said additional opening for releasing one end of one of the plates as the frame is moved into engagement with said last named means, and means mounted on the other side of said additional opening for ejecting the released plate as the frame is moved in an opposite direction over said last named means.

5. In a stripping device for removing plates and cards releasably retained in frames where the cards have one end secured therein by a raised portion on the frame and wherein the plates are locked in by spring-like members, a framework having a flat top wall, guide means mounted on the top wall for guiding the frames moved along the top wall, said top wall being formed with an opening therein, means mounted on the framework on one side of said opening for releasing one end of the plate and one end of the card as the frame is moved into engagement with the same, the releasing means consisting of a pointed spring-like finger adapted to be moved between the frame and the card to raise the card over the raised portion retaining the card, and a button-like releasing member for raising the spring member to release the plate, and means mounted on the other side of said opening for ejecting the cards and plates therefrom as the frame is moved in an opposite direction over said last named means.

6. A stripping device as in claim 5 wherein said last named means includes vertically extending abutment members.

7. In a stripping device for removing plates and cards releasably retained in frames wherein the cards have one end secured therein by a raised portion on the frame and wherein the plates are spring locked to said frames, a framework having a flat top wall, guide means mounted on the top wall for guiding the frames moved along the top wall, said top wall being formed with an opening therein, separating means mounted on the framework on one side of said opening for forcing one end of the plate and one end of the card away from said frame as the frame is moved into engagement with the same, the separating means comprising a spring-like finger adapted to be moved between the frame and the card to raise the card over the raised portion retaining the card, and a button-like releasing member for raising the spring member to release the plate, and means mounted on the other side of said opening for ejecting the cards and plates therefrom as the frame is moved in an opposite direction over said last named means.

8. In a stripping device of the kind described having a framework including a top wall, a workpiece handling and processing path for stripping flat members releasably retained in frames, said path comprising a supply hopper for unstripped frames, said supply hopper being supported by said framework and disposed to normally direct the handling of frames in a first direction across said top wall, an opening in said top wall substantially aligned with said supply hopper, means mounted on the framework on a first side of said opening for freeing one end of a said flat member as the frame is moved into engagement with the same, the freeing means including a finger-like member adapted to move the flat member and the frame apart, and abutment means mounted on a second side of said opening opposite said first side for ejecting the flat member from said frame and into said opening as the frame is moved over said abutment means, and a discharge hopper for receiving each frame after stripping, said discharge hopper being mounted to said framework and disposed to complete said path.

References Cited in the file of this patent

UNITED STATES PATENTS

| | | |
|---|---|---|
| 1,048,821 | Gill | Dec. 31, 1912 |
| 1,472,833 | Herold | Nov. 6, 1923 |
| 1,863,897 | Cloppert | June 21, 1932 |
| 2,003,648 | Frye | June 4, 1935 |
| 2,158,168 | Woodruff | May 16, 1939 |
| 2,503,683 | Perkins | Apr. 11, 1950 |
| 2,522,316 | Steiner | Sept. 12, 1950 |
| 2,595,641 | Clearwater | May 6, 1952 |
| 2,648,276 | Gollwitzer | Aug. 11, 1953 |
| 2,820,282 | Schneider | Jan. 21, 1958 |
| 2,836,883 | Puck | June 3, 1958 |